US009602657B2

(12) United States Patent
Toorenaar (10) Patent No.: US 9,602,657 B2
(45) Date of Patent: Mar. 21, 2017

(54) CALLBACK TELECOMMUNICATION SYSTEM (71) Applicant: TELIO NEDERLAND B.V., Amsterdam (NL)

(72) Inventor: Gerolf Kiliaan Toorenaar, Amsterdam (NL)

(73) Assignee: TELIO NEDERLAND B.V., Amsterdam (NL)

( * ) Notice: Subject to any disclaimer, the term of this patent is extended or adjusted under 35 U.S.C. 154(b) by 0 days.

(21) Appl. No.: 15/107,379

(22) PCT Filed: Dec. 24, 2013

(86) PCT No.: PCT/EP2013/078001
§ 371 (c)(1),
(2) Date: Jun. 22, 2016

(87) PCT Pub. No.: WO2015/096867
PCT Pub. Date: Jul. 2, 2015

(65) Prior Publication Data
US 2017/0006157 A1    Jan. 5, 2017

(51) Int. Cl.
*H04M 15/00* (2006.01)
*H04M 3/42* (2006.01)
(Continued)

(52) U.S. Cl.
CPC ... *H04M 3/42195* (2013.01); *H04M 3/42059* (2013.01); *H04M 3/42102* (2013.01);
(Continued)

(58) Field of Classification Search
CPC ...... H04M 1/247; H04M 1/2535; H04M 1/26; H04M 1/274566; H04M 3/42059;
(Continued)

(56) References Cited

U.S. PATENT DOCUMENTS 5,825,858 A * 10/1998 Shaffer ................ H04M 3/562
379/114.06
6,307,928 B1 * 10/2001 Yamasaki .......... H04M 3/4228
379/114.21
(Continued)

FOREIGN PATENT DOCUMENTS

DE    202010013573 U1    6/2011
EP       2575338 A1       4/2013

*Primary Examiner* — Binh Tieu
(74) *Attorney, Agent, or Firm* — Aeon Law, PLLC; Adam Philipp (57) ABSTRACT A telecommunication system enables a server to receive a request from a calling external telecommunication device (CTD) for a telecommunication connection with a receiving external telecommunication device (RTD), establish data connection with CTD in response to request, receive from CTD a receiver identifier (RID) and store RID, establish a data connection with RTD using RID, transmit to RTD, after data connection is established, a server identifier (SID), close data connection with RTD after transmission, receive a request for a telecommunication connection from RID via SID within a time slot after said closing, check, in response to request for a telecommunication connection from RTD via SID, if RID of RTD matches stored RID, and establish a telecommunication connection through server between CTD and RTD if RID matches stored RID.

28 Claims, 8 Drawing Sheets (51) Int. Cl.
    *H04M 7/00* (2006.01)
    *H04M 15/08* (2006.01)
(52) U.S. Cl.
    CPC ......... *H04M 7/0024* (2013.01); *H04M 15/08* (2013.01); *H04M 2201/14* (2013.01)
(58) Field of Classification Search
    CPC ...... H04M 3/48; H04M 7/1245; H04M 15/08; H04M 2215/62; H04M 2242/22; H04L 65/1069; H04L 2012/563
    USPC ..... 379/111, 112.01, 114.01, 114.02, 114.03, 379/114.05, 114.21, 114.29, 115.01, 379/121.01, 122, 126, 127.01, 209.01, 379/210.01, 211.01, 201.01
    See application file for complete search history.

(56) References Cited

U.S. PATENT DOCUMENTS

| | | | | |
|---|---|---|---|---|
| 6,463,144 | B1* | 10/2002 | Dunn | H04M 3/48 370/352 |
| 8,537,994 | B2* | 9/2013 | Hillier | H04W 12/08 379/142.01 |
| 2005/0021664 | A1 | 1/2005 | Bennett | |
| 2005/0212664 | A1 | 9/2005 | Sawai | |
| 2009/0097624 | A1 | 4/2009 | Sangberg | |
| 2011/0286385 | A1* | 11/2011 | Goh | H04M 1/247 370/328 |
| 2012/0131206 | A1* | 5/2012 | Shunji | H04L 67/26 709/227 |
| 2014/0337765 | A1* | 11/2014 | Jain | H04L 65/1069 715/753 |

* cited by examiner

CALLBACK TELECOMMUNICATION SYSTEM

FIELD OF THE INVENTION

The invention relates to a telecommunication system, a method for establishing a telecommunication connection, a telecommunication device, and software for a telecommunication system.

BACKGROUND OF THE INVENTION

One of the most basic forms of a modern telecommunication system comprises a telephone system, allowing two users to establish a voice connection, in order to have a telephone conversation.

This basic telephone system developed over the years, first adding some additional functionality and establishing a billing system that was based for instance upon the duration of the telephone call, and upon the respective location of the caller and the receiver. Later on, further functionalities were added. One of these functionalities was collect calling. In this way, a caller could put the costs of the telephone call to the receiver.

In the early telephone systems, where switching and connection was done manually, it was easy to check and control the connections. In more modern electronic and digital switching centres, it became more and more difficult to check and control the connections. In particular when a call crossed different providers and even borders, it was found complicated or impossible to check the connection. In particular when the caller is not allowed to have telecommunication with certain parties, or is restricted in his or her permission to have telecommunication. This is even more complicated if the receiving party should be billed for, or should be able to accept, the costs for a telecommunication connection with the caller.

SUMMARY OF THE INVENTION

A disadvantage of prior art is that current telecommunication systems the possibilities for providing a telecommunication connection in a secure and yet controllable way and/or in a way that allows monitoring is limited.

Hence, it is an aspect of the invention to provide an alternative telecommunication system and device for providing a telecommunication connection in a secure and filtered way, and allowing monitoring. Additionally and/or alternatively, the telecommunication system allows these telecommunication connections even in an international context, or when various connecting parties are involved. This preferably further at least partly obviates one or more of above-described drawbacks.

The invention thus provides a telecommunication system comprising at least one server (S) running a computer program which enables said server (S) to:
- receive a request from a calling external telecommunication device (CTD) for a telecommunication connection with a receiving external telecommunication device (RTD);
- establish a data connection with said calling external telecommunication device (CTD) in response to said request;
- receive from said calling external telecommunication device (CTD) a receiver identifier (RID) and store said receiver identifier (RID);
- establish a data connection with said receiving external telecommunication device (RTD) using said receiver identifier (RID);
- transmit to said receiving external telecommunication device (RTD), after a data connection with said receiving external telecommunication device (RTD) is established, a server identifier (SID);
- close said data connection with said receiving external telecommunication device (RTD) after said transmission;
- receive a request for a telecommunication connection from said receiving external telecommunication device (RTD) via said server identifier (SID) within a time slot after said closing;
- check, in response to said request for a telecommunication connection from said receiving external telecommunication device (RTD) via said server identifier (SID), if a receiver identifier of said receiving external communication device (RTD) matches said stored receiver identifier (RID), and
- establish a telecommunication connection through said server (S) between said calling external telecommunication device (CTD) and said receiving external telecommunication device (RTD) if the receiver identifier matches said stored receiver identifier (RID).

In the application, reference a made to a server. Such a server may be one server device, for instance a computer device, located at a location. Alternatively, a server may refer to at least one server device, connected via one or more data connections, at the same location and/or located at remote, in particular physically/geographically remote locations. Each separate server may run part of the telecommunication system. For instance, one of the databases may run on a separate, even a physically or geographically remote, server device.

The telecommunication device in its broadest sense can be any device allowing telecommunication between a caller and a receiver.

A data connection is a coupling allowing data, in particular digital data, to be transferred between devices, in particular computer devices or devices comprising a data processor. The data connection can comprise one or more parts that can functionally coupled to one another to transfer data from one device to another. Such a connection may comprises wired (including optical wiring, for instance) parts, but may also comprise wireless parts. Such data connections in general are known to a skilled person. The data can be transferred via said data connection via a variety of known protocols.

A telecommunication connection is a connection that allows a least two persons to engage into functionally direct communication. We will refer to these two persons as caller and receiver. Such a direct communication may include for instance a chat session. The communication may alternatively or additionally be a voice communication. Thus, the telecommunication connection may allow a telephone conversation between two or more people. The telecommunication connection may also include a direct (digital) video link, allowing direct visual contact between the at least two persons. Known examples of such video calling as such are provided via Face Time and Skype, for instance. The telecommunication connection in particular allows a functionally live communication between two or more persons.

The caller identifier in an embodiment is an identifier identifying the calling telecommunication device. In combination, or alternatively, the caller identifier is a unique identifier identifying the actual person making requesting a telecommunication connection. For instance, the caller identifier may be a telephone number. The caller identifier may also comprise a username and a password. The caller identifier may be linked to the name of the person.

The receiver identifier may comprise, in an embodiment the receiver identifier can be, an identifier identifying the receiving telecommunication device. In an embodiment or alternatively, the receiver identifier comprises a unique identifier, identifying the actual person the caller wants to speak. Alternatively of in combination, the receiver identifier is a telephone number of that person. The receiver identifier may be linked to the name of the person.

The server identifier is may comprise, in an embodiment be, an identifier identifying the server. In an embodiment o alternatively, the receiver identifier comprises a unique identifier identifying the actual server. Alternatively of in combination, the receiver identifier is a telephone number of that server, or its IP address.

The telecommunication system allows the actual telecommunication connection to be billed to at least selected from the receiver (R), the caller (C) and both. In an embodiment, the costs are transferred to the receiver (R).

Costs may be billed and/or paid using known payment systems. Examples of payment systems and methods comprise, but are not limited to, credit card, debit card, systems provided for instance by PayPal, debit accounts deposited at telecommunication providers, prepaid telephone cards. The SID may also be provided as a premium-rate telephone number. Premium-rate telephone numbers are telephone numbers for telephone calls during which certain services are provided, and for which prices higher than normal are charged. Unlike a normal call, part of the call charge is paid to the service provider, thus enabling businesses to be funded via the calls. While the billing is different, calls are usually routed the same way they are for a toll-free telephone number, being anywhere despite the area code used. These telephone numbers are usually allocated from a national telephone numbering plan in such a way that they are easily distinguished from other numbers. Telephone companies typically offer blocking services to allow telephone customers to prevent access to these number ranges from their telephones. In some jurisdictions, telephone companies are required by law to offer such blocking. Thus, part of the server may be a device or a system providing premium-rate telephone number services.

In particular, the invention provides an alternative telecommunication system and device for giving for instance inmates, or other people that are restricted in their allowance to make telecommunication connections, or are limited in people that they are allowed to contact. It allows these people and gives them the possibility to call for instance their relatives or other allowed persons using call technology in a secure, filtered way and/or allowing monitoring. More in particular, it allows deferring costs to a party, for instance the party receiving the call, or even an external party or person.

Current system do not allow at least one of the following functionalities or a combination thereof, or, put the other way around, the current telecommunication system allows at least one of these functionalities or combinations thereof. Thus, known systems:

Do not allow inmates in penitentiary institutions to request a call-back from a B-party that will accept the charges for the call to be deferred to him/her.

Do not check if international prefix is, or is not allowed to be called by the initial caller.

Do not automatically adapt the language of the message played to the B-party depending on the prefix of the called number.

Do not check if the B-party number is authorised to be called by the caller

Do not check if the B-party number is unauthorised to be called by the caller

Do not have the ability to check on different levels (user level, group level, site level (prison location) and national level)) if the call is authorised or not.

Do not log the authorised and unauthorized numbers calls attempts into a database.

Do not implement an automated check to define if the B-party number is a lawyer number.

Do not provide the recording possibility of the calls and the storing of call recordings for legal purposes.

Do not provide an automated way to delete calls after a defined period of time, defined by the legal institution acting as customer.

Do not have the ability to avoid recording of the calls for specific numbers

Do not have the ability to store the recorded calls files for a specified duration in time, defined by law.

Do not register if the B-party decided to accept or reject the call request in a database.

Do not provide the ability to request a call-back from a phone number and on call back moment automatically connect the two calls (the outbound call from the caller and the inbound call from the call receiver only on automatic caller ID matching).

Do not automatically control the length of the call based on the legally allowed duration of the call (including maximum billing, maximum cost of the call) and automatically disconnects the call with notification to both parts when reaching the call limitation.

The invention further provides a computer program comprising software code portions which, when running on a data processing system, performs the method of the invention. The invention further relates to a data carrier provided with that computer program, and a signal carrying at least part of said computer program.

Further particular embodiments are for instance described in the depending claims. More in particular, the following embodiments are provided, that may allow one or more of the functionalities mentioned.

The software allows the server to close said data connection with said receiving external telecommunication device (RTD) after transmission. This may include that after transmission, the server actively closes the connection with the receiver. Alternatively, the receiver actively closes the connection. Then, the server will register the connection as closed. It may even be possible to maintain the first connection with the server, while the receiver makes a (new) telecommunication connection with the server. Again, the server checks the receiver identifier and closes the first connection.

In an embodiment, the computer program enables said server (S) to:

further transmit to said receiving external telecommunication device (RTD), after a data connection with said receiving external telecommunication device (RTD) is established, with said server identifier (SID), an indication to the receiver (R) that in order to establish a telecommunication connection to use the receiving external telecommunication device (RTD) to request a data connection with said server (S) using said server identification (SID).

In an embodiment, the computer program enables said server (S) to:
further transmit to said receiving external telecommunication device (RTD), after a data connection with said receiving external telecommunication device (RTD) is established, with said server identifier (SID), an indication to the receiver (R) that in order to establish a telecommunication connection to use the receiving external telecommunication device (RTD) to request a data connection with said server (S) using said server identification (SID), and an indication to said receiver (R) of said time slot for establishing said request.

In an embodiment, the computer program further enables said server (S) to:
establish a billing of said receiving external communication device (RTD) for the costs of said telecommunication connection.

In an embodiment, the computer program enables said server (S) to:
receive a request from a caller (C) using a calling external telecommunication device (CTD) for a telecommunication connection with a receiver (R) via a receiving external telecommunication device (RTD).

In an embodiment, the computer program enables said server (S) to:
maintain said data connection with said calling external telecommunication device (CTD) at least until the end of said time slot, and if said receiving external communication device (RTD) establishes said telecommunication connection convert said data connection into a telecommunication connection.

In an embodiment, the computer program enables said server (S) when receiving said request from a caller (C) to establish a telecommunication connection with said calling external telecommunication device (CTD) in response to said request.

In an embodiment, the computer program enables said server (S) to:
receive and store a caller identifier (CID) from said calling external telecommunication device (CTD) after establishing said data connection with said calling external telecommunication device (CTD) in response to said request of said calling external telecommunication device (CTD).

In an embodiment, the computer program further enables said server (S) to:
run a query on a database for said caller identifier (CID) and said receiver identifier (RID), said database provided on said server (S) and comprising a series of caller identifiers, receiver identifiers, and indications indicating telecommunication connection rights relating to caller identifiers, said rights comprising prohibitions to make a telecommunication connection to specified receiver identifiers;
establish said data connection with said receiving external telecommunication device (RTD) using said receiver identifier (RID) if the query results in a permission for providing a telecommunication connection of said caller (R) with said receiver (R).

The database may also be functionally coupled to the server (S). In this way, the server (S) can functionally couple with said database and run the query, or have the query run.

In an embodiment, the computer program enables said server (S) to maintain a data connection with said calling external telecommunication device (CTD) until said receiving external telecommunication device (RTD) established a telecommunication connection with said server (S), more in particular until said server (S) establishes said telecommunication connection between said calling external telecommunication device (CTD) and said receiving external telecommunication device (RTD).

In an embodiment, the computer program further enables said server (S) to:
transmit to said receiving external telecommunication device (RTD), after said data connection with said receiving external telecommunication device (RTD) is established, in addition to said server identifier (SID), said stored caller identifier (CID), and an indication to the receiver (R) that in order to establish a telecommunication connection with said caller (C) identified with said caller identifier (CID) to use the receiving external telecommunication device (RTD) to request a data connection with said server (S) using said server identification (SID).

The time slot within which the receiver can make a request for a telecommunication connection usually is limited to a time needed to for instance dial a telephone number. Usually, the time slot will be several minutes. In an embodiment, the time slot is less than five minutes, in particular less than two minutes. Thus, after closing, usually the receiver has several minutes to call back. In an embodiment, during this time the caller will stay connected to the server.

In an embodiment, the caller identifier (CID) comprises a calling external telecommunication device identifier.

In an embodiment, the caller identifier (CID) comprises a user identifier identifying the caller (C).

In an embodiment, the server (S) comprises a server device, and said telecommunication connection is maintained by said server device.

In an embodiment, the server comprises the database, and the database is provided on said server (S), in particular in said server device mentioned above.

In an embodiment, the server (S) comprises server devices, with a first server device maintaining said telecommunication connection, and database is provided on a further server device remote from said first server device.

In an embodiment, the server (S) comprises server devices, with a first server device maintaining said telecommunication connection, and database is provided on a second server device remote from said first server device, and said telecommunication connection is provided via a third server device, in particular a third server device remote from said first and/or said second server devices.

In an embodiment, the computer program enables said server (S) to provide billing of costs of said telecommunication connection based upon starting costs and duration of said telecommunication connection, more in particular enables said server to provide billing based upon the physical location of said calling external telecommunication device (CTD) and/or said receiving external telecommunication device (RTD).

In an embodiment, the telecommunication connection comprises a voice connection, in particular using a VOIP protocol.

In an embodiment, the telecommunication system comprises a series of dedicated communication devices, arranges for only contacting said server (S), and said dedicated communication devices each comprising a dedicated identifier, said server (S) comprising a database of dedicated identifiers of said dedicated calling telecommunication devices, in particular wherein said dedicated identifier is part of the caller identifier.

In an embodiment, the computer program enables said server (S) to transmit a voice message to said receiving external telecommunication device (RTD) said voice message when played in said receiving external telecommunication device (RTD), telling said receiver (R) to request a telecommunication connection using said caller identifier (CID) within said time slot, and for instance telling the receiver (R) he/she is receiving a call request from a specified location, or using a specified telecommunication device, or from a defined telephone number. In particular asking the receiver (R) to accept the request by providing a user response via the receiving external telecommunication device (RTD) or to decline the request by providing an alternative user response via the receiving external telecommunication device (RTD), in particular said server (S) after the receiver input has been transmitted, or after a predefined time-out, closes said data connection with said receiving external telecommunication device (RTD).

In an embodiment, the database comprises a series of caller identifiers, and for each caller identifier an indication of the right the caller (C) has and/or the calling external telecommunication device (CTD) has, or do not have, to establish a telecommunication connection with the receiver (R) and/or the receiver external telecommunication device (RTD).

The invention further relates to a computer program comprising software code portions which, when running on a data processor, configure said data processor to:
  receive a request from a calling external telecommunication device (CTD) for a telecommunication connection with a receiving external telecommunication device (RTD);
  establish a data connection with said calling external telecommunication device (CTD) in response to said request;
  receive from said calling external telecommunication device (CTD) a receiver identifier (RID) and store said receiver identifier (RID);
  establish a data connection with said receiving external telecommunication device (RTD) using said receiver identifier (RID);
  transmit to said receiving external telecommunication device (RTD), after a data connection with said receiving external telecommunication device (RTD) is established, a server identifier (SID);
  close said data connection with said receiving external telecommunication device (RTD) after said transmission;
  receive a request for a telecommunication connection from said receiving external telecommunication device (RTD) via said server identifier (SID) within a time slot after said closing;
  check, in response to said request for a telecommunication connection from said receiving external telecommunication device (RTD) via said server identifier (SID), if a receiver identifier of said receiving external communication device (RTD) matches said stored receiver identifier (RID), and
  establish a telecommunication connection between said calling external telecommunication device (CTD) and said receiving external telecommunication device (RTD) if the receiver identifier matches said stored receiver identifier (RID).

The invention further pertains to a data carrier provided with this computer program.

The invention further pertains to a signal carrying at least part of this computer program.

The invention further pertains to a signal sequence representing a program for being executed on a computer, said signal sequence representing this computer program.

The invention further pertains to a method for establishing a telecommunication connection between a calling external telecommunication device (CTD) and a receiving external telecommunication device (RTD) via a server (S), wherein said server (S) comprises a computer program which, when running on sad server, configures said server to:
  receive a receiver identifier (RID) from said calling external telecommunication device (CTD);
  transmit to said receiving external telecommunication device (RTD), contacted using at least part of said receiver identifier (RID), a server identifier (SID);
  receive a request for a telecommunication connection from said receiving external telecommunication device (RTD) via said server identifier (SID) within a time slot after said transmission;
  check, in response to said request for a telecommunication connection from said receiving external telecommunication device (RTD) via said server identifier (SID), if a receiver identifier of said receiving external communication device (RTD) matches said stored receiver identifier (RID);
  establish a telecommunication connection through said server (S) between said calling external telecommunication device (CTD) and said receiving external telecommunication device (RTD) if the receiver identifier matches said stored receiver identifier (RID).

The invention further pertains to a communication device limited to contact only the telecommunication system of any one of the preceding claims, said communication device comprising a device identifier (DID) that is transmitted to said telecommunication system when contacting said telecommunication system, in particular said device identifier (DID) forming part of said caller identifier (CID). For instance, the DID may comprise the MAC address of a device, or another code that is included in the firmware and/or that may be coupled using an insertable device, like a chip card.

In an embodiment, the caller calls, and is connected to, a service telephone number, enters the telephone number of the receiver, and is put into wait. The receiver receives from the server details instruction to call a service number. Usually, the receiver is further instructed to use his telecommunication device or to call form the currently contacted telephone number, his receiver identifier. The receiver then calls the service number from the predefined telephone number or his telecommunication device (thus providing a receiver identifier). The caller and the receiver are then connected if the current receiver identifier matches the earlier receiver identifier. Before the caller is contacted, the server (S) may run security checks. The server (S) may for instance have access to or be provided with a database holding rules and permissions indicating rights of the caller. The receiver is subsequently billed by the service number.

The invention further pertains to a server part for the telecommunication system of any one of the preceding claims, said server part forming part of the server (S) of the telecommunication system and running a computer program which enables said server part to:
  receive a request from a calling external telecommunication device (CTD) for a telecommunication connection with a receiving external telecommunication device (RTD);

establish a data connection with said calling external telecommunication device (CTD) in response to said request;

receive from said calling external telecommunication device (CTD) a receiver identifier (RID) and store said receiver identifier (RID);

establish a data connection with said receiving external telecommunication device (RTD) using said receiver identifier (RID);

transmit to said receiving external telecommunication device (RTD), after a data connection with said receiving external telecommunication device (RTD) is established, a server identifier (SID).

The server part can be a server device, or a distributed server. It is part of the earlier defined server, but dedicated for part of the functionality of the telecommunication system.

In an embodiment, the computer program which enables said server part to further:

communicate to said further server (S) said receiver identifier (RID), and said time slot, and facilitates in establishing a telecommunication connection between said caller (C) and said receiver (R) through said server (S).

The term "substantially" herein, like in "substantially consists", will be understood by and clear to a person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally", when used for instance in "functionally coupled" or "functionally direct communication", will be understood by and clear to a person skilled in the art. The term "substantially" may also include embodiments with "entirely", "completely", "all", etc. Hence, in embodiments the adjective substantially may also be removed. Thus, for instance "functionally direct communication" comprises direct, live communication. It may also comprise communication that, from a perspective of the parties communication, is experienced as "live". Thus, like for instance VIOP, there may be a small amount of time between various data packages comprising digital voice data, but these amounts of time are so small that for users it seems as if there is an open communication line or telephone line available.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DESCRIPTION OF PREFERRED EMBODIMENTS

Figure 1:
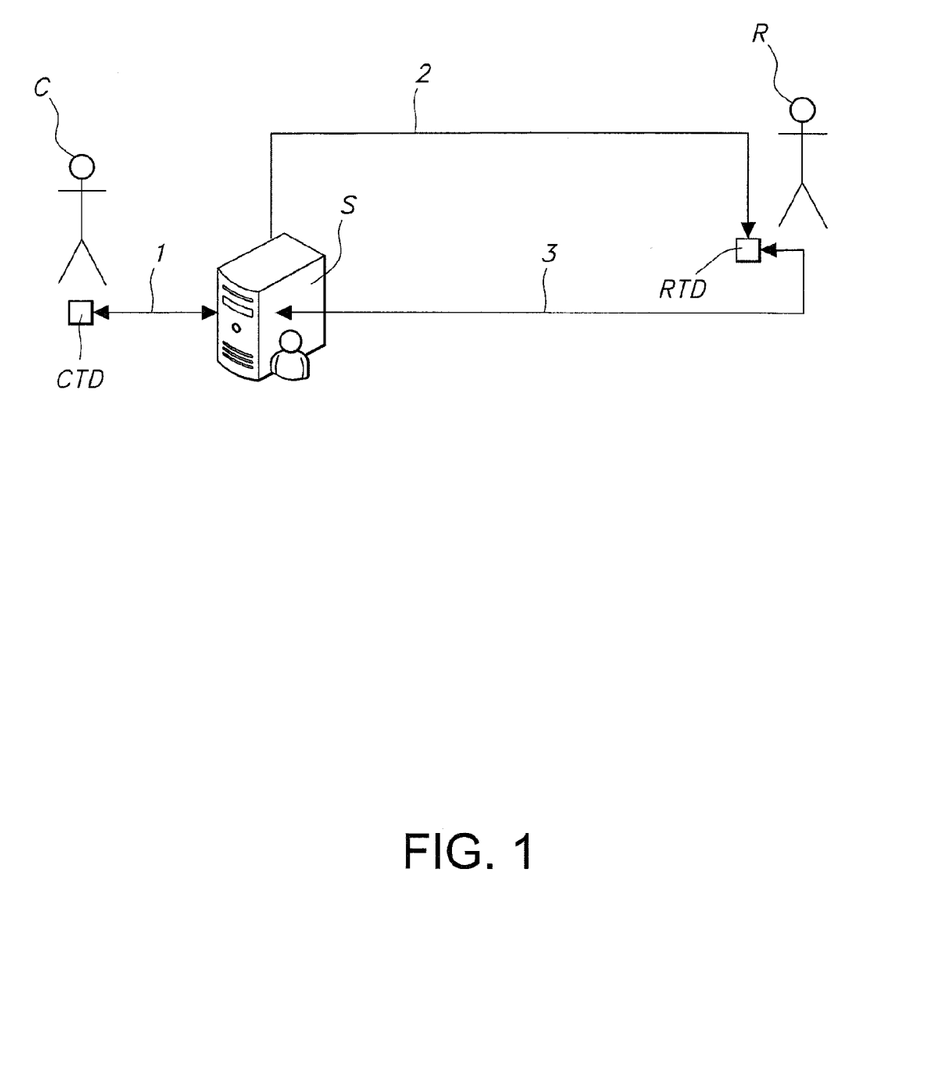
FIG. 1 schematically a high level overview of an embodiment of a telecommunication system.

FIG. 1 schematically depicts a system according to an aspect of the invention on a high level. FIG. 1 shows a caller (C) operating a calling external telecommunication device (CTD). Such a calling external telecommunication device (CTD) can for instance be a telephone. This can be a telephone connected to a fixed line. It can also be a mobile phone, which connects wireless, for instance via a known wireless telephone protocol like GSM, but it may also connect via a wireless data protocol. The calling external telecommunication device (CTD) can also be a smartphone, a computer device, a tablet, or another device allowing a fixed or wireless coupling. Via a data coupling or data connection, a voice communication can for instance be established using VOIP, or a life video link may be established.

FIG. 1 further shows the other end of a telecommunication connection, the receiver (R). The receiver (R) can operate a receiving external telecommunication device (RTD). Such a receiving external telecommunication device (RTD) can be of the type already described for the calling external telecommunication device (CTD).

The FIG. 1 further shows a server (S) connecting the calling external telecommunication device (CTD) and the receiving external telecommunication device (RTD) with one another. This server (S) is here schematically represented by a computer or computer device, known as such. In one embodiment, the server (S) represents a telecommunication provider. As already explained earlier, the server (S) may represent various devices, switches, routers, and the like, that make a coupling between the calling external telecommunication device (CTD) and the receiving external telecommunication device (RTD) possible to allow the caller (C) and the receiver (R) to have a "live" communication. A basic type of live communication is a telephone call.

In operation, in this basic example of FIG. 1, the caller (C) using his calling external telecommunication device (CTD) calls the server (S) on a special service telephone number. The caller then indicates to the server (S) a receiver identifier (RID). In this basic example, this can be a telephone number. While the caller (C) stays on the line, the server (S) calls the receiver (R) on his or her receiving external telecommunication device (RTD). When the receiving external telecommunication device (RTD) answers the call from the server (S), the server (S) breaks off the connection. When the receiver (R) now calls back the server (S) within a defined time window, the server (S) answers this call, and checks if the telecommunication device calling back is the receiving external telecommunication device (RTD). If this is the case, server (S) connects the calling external telecommunication device (CTD) and the receiving external telecommunication device (RTD). In this example, the receiver (R) will be billed for the telecommunication connection between the receiver (R) and the caller (C).

It will be evident that many further and alternative embodiments of this basic example of FIG. 1 are possible.

Figure 2:
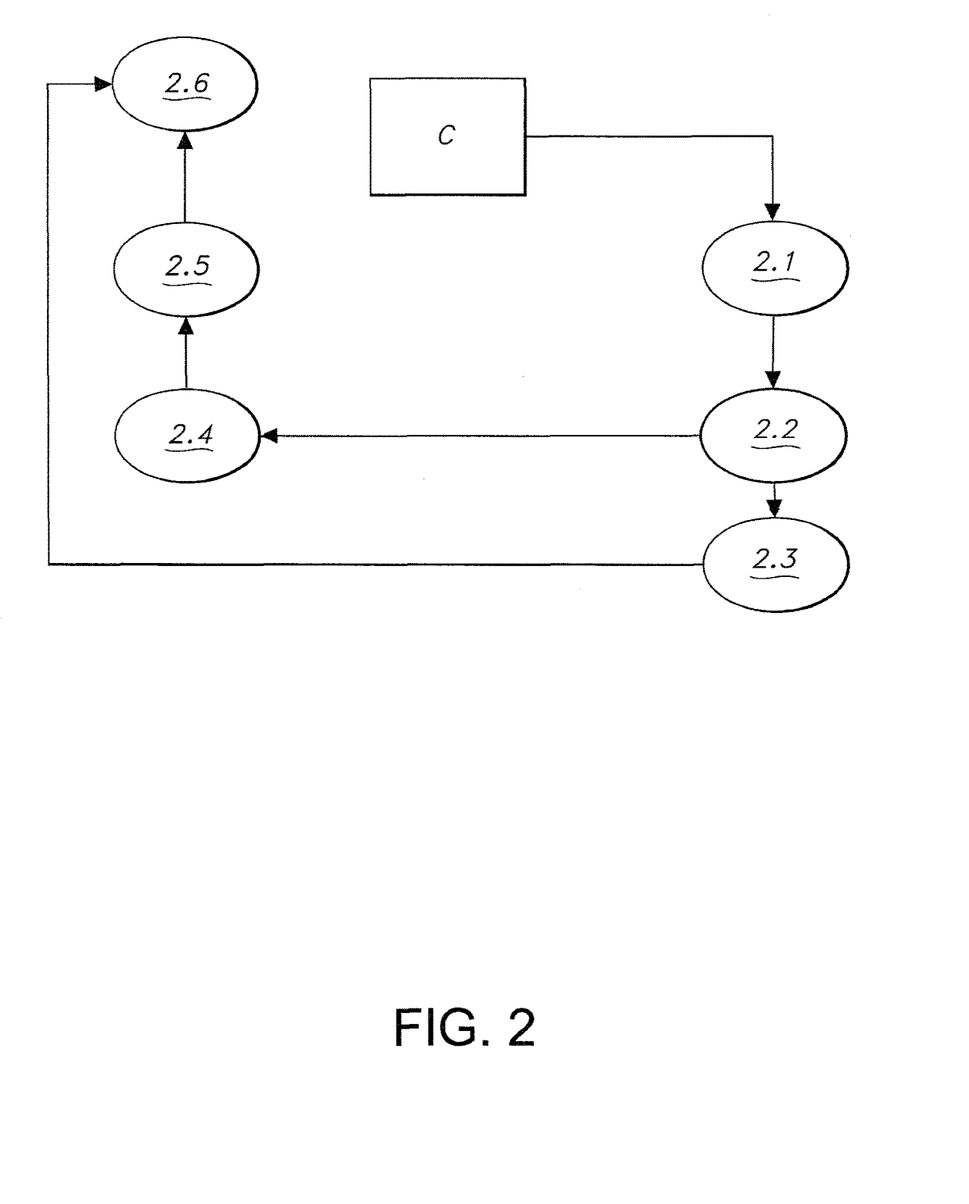
FIG. 2 describes the complete process from the caller perspective. from the moment the caller picks-up the phone to call termination.

FIG. 2 shows the telecommunication system from the side of the caller (C). In this embodiment, the calling external telecommunication device (CTD) is a device that is dedicated for the telecommunication system. Here, the caller (C) just dials a service number for contacting the server (S), and then enters upon request the receiver telephone number (2.1), which is in this embodiment the receiver identifier (RID). While holding the line (2.2), the server (S) processes the receiver identifier (RID) and also obtains an identifier from the calling external telecommunication device (CTD), for instance a telephone number, a MAC address, or another identifier that identifies the calling external telecommunication device (CTD). Alternatively or additionally, the server (S) may ask the caller (C) via the called telecommunication device (CTD) for a code, like a password, a PIN code, or a biometrical scan, thus providing a (an additional) caller identifier (CID).

Based upon the receiver identifier (RID) and/or the caller indenter (CID), the server (S) now may reject the call (2.3) and terminate the connection (2.6).

Alternatively, the server (S) may accept the request for a telecommunication connection and call the receiving external telecommunication device (RTD) (2.4). When the receiver answers the call and calls back, the server (S) connects the receiving external telecommunication device (RTD) and the calling external telecommunication device (CTD) in a telecommunication connection (2.5). Subsequently, at least one or both of the caller (C) and the receiver (R) may terminate the telecommunication connection (2.6).

Figure 3:
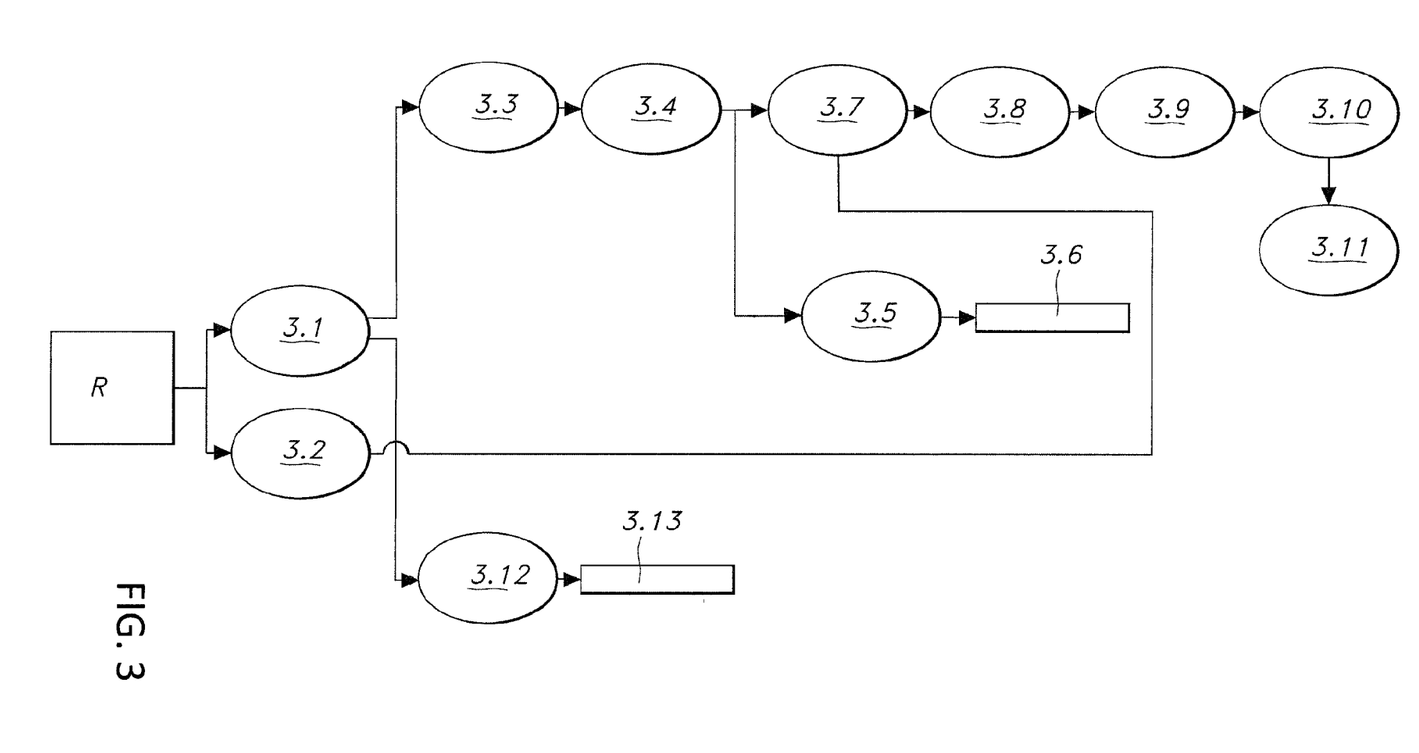
FIG. 3 describes the complete process from the receiver or B-party perspective.

From the receiver (R) perspective, the telecommunication system may comprise the following steps, illustrated in FIG. 3. As explained, the receiving external telecommunication device (RTD) receives a request for a telecommunication connection from the server (S). This may be a telephone call, but also a request for a data connection. The request may be answered (3.1), or a answering machine answers the request or the receiver (R) just hangs up (3.2). The receiver (R) may refuse the request (3.12) and no telecommunication connection is established (3.13).

The receiver (R) may also accept the request (3.3). The server (S) may transmit to the receiving external telecommunication device (RTD) an indication that the receiver (R) has to request a telecommunication connection (3.4). Such an indication may be a voice message, for instance an automated voice message, indication for instance a telephone number that needs to be called. The indication may also comprise an indication of a time window within which the request has to be made. This time window may be one or more minutes. The receiver (R) or the server (S) then closes the connection. If the receiver (R) does no request for a telecommunication connection within a time window after closing the earlier connection (3.5), the request from the caller (C) is terminated. The server (S) may closed the connection with the caller (C) and/or with the calling external telecommunication device (CTD). If the receiver (R) now requests the server (S) for a telecommunication connection (with the caller (C)) within the time window (3.7), the server (S) answers the request, and establishes a telecommunication connection with the receiver (R). The caller (C) is still connected with his calling external telecommunication device (CTD) with the server (S). This connection can already be a telecommunication connection, or a general data connection that is now changes into a telecommunication connection. It may for instance be, or already was, a telephone connection. The connection allows for functionally live communication. Functionally live communication includes at least e telephone communication, digitally, for instance VIOP, but it may also start as an analogue telephone connection. In modern telecommunication, it is evident that the sharp boundary is difficult to give, as telephone communication now often take place via a digital data connection via for instance VIOP.

The server (S) now connects the calling external telecommunication device (CTD) and the receiving external telecommunication device (RTD) (3.8). It is evident that the server (S) may thus operate as a switch, or as a router, switching and/or routing incoming data from the caller (C) to the receiver (R) and from the receiver (R) to the caller (C) at such a time frame that the caller (C) and receiver (R) experience a live communication channel between them (3.9).

Subsequently, one of the caller (C) and/or the receiver (R) may terminate the telecommunication connection (old fashioned: "hang up") (3.10). Subsequently, the server (S) terminates the telecommunication channel. The server (S) may now arrange for the billing. The receiver (R), calling in into the server (S), may for instance be billed.

The telecommunication system illustrated so far allows the following features to be included. The server (S), as a single device or a set of couples devices that are coupled via at least a data connection allowing data exchange, may comprise call validation rules. Such rules may comprise for instance a valid number check and/or an available country check. Thus, it is checked if (at least part of) the caller identifier (CID) is valid, and/or if the receiver identifier (RID) are valid. The server often stores both the CID and the RID.

The server (S), for instance one of the server device, may comprise one or more databases holding a series of receiver identifiers and a series of caller identifiers. The database may further comprise at least one selected from general rules, rules for each receiver identifier rules for each caller identifier, and a combination thereof. Using these rules, and the received identifiers, i.e. the caller identifier (CID) and the receiver identifier (RID), the server (S) can decide if the caller (C) is allowed to have a telecommunication connection with the receiver (R), if there are conditions for such a telecommunication connection. The server (S) may extract from the receiver identifiers language instructions, billing instructions and rules. It may check for white list (authorized) numbers, black list (unauthorized) numbers, apply filtering of the calls depending on caller rights. The server (S) may check the local lawyer and other private numbers list (if applicable). The server (S) may also be configured to automatically cancel of the procedure when configured time-out is reached. The server (S) may automatically apply at least one of rates, maximum call duration, and limitations.

Using the telecommunication system, it is for instance possible to configure a secure and controlled prison telecommunication system, providing for instance telephone lines that can be used by prisoners ("inmates").

Combining FIG. 1, FIG. 2 and FIG. 3, FIG. 4 now provides a more detailed overview of an embodiment of the telecommunication system.

Figure 4:
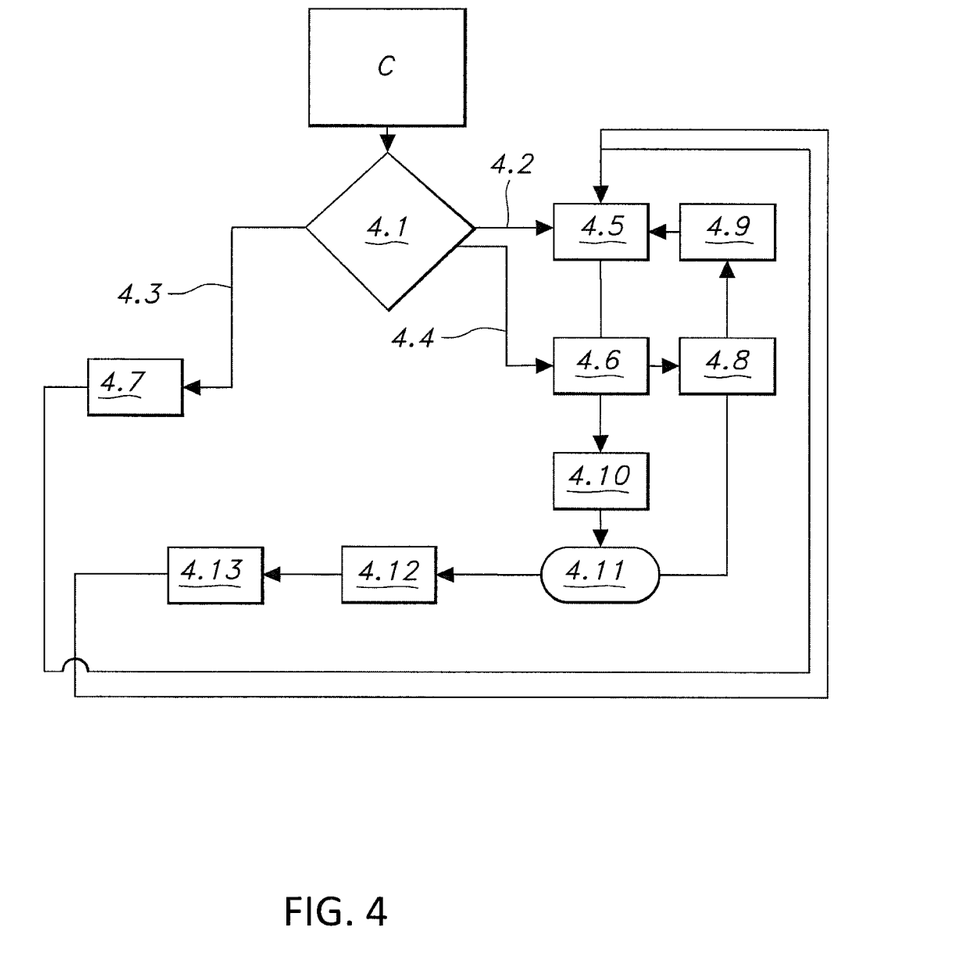
FIG. 4 Describes steps from the moment the caller enters establishes the connexion with the telecommunication system to the termination of the call.

A caller (C), using his or her calling external telecommunication device (CTD), sends a request for a telecommunication connection to a server (S), here dialling a dedicated telephone number. Next, caller (C) enters the telephone number of the receiver (R), the telephone number here representing the receiver identifier (RID). The server (S) furthermore stores the telephone number of the calling external telecommunication device (CTD) as the caller identifier (CID). The server (S) subsequently in 4.1 calls the receiver (R) using the provided telephone number, and notifies the caller (C) to stay on the line. If the receiver (R) stays inactive for a predefined amount of time (4.2) the server (S) terminates the connection with the caller (C) (4.5). If the receiver (R) declines the request for a connection by the server (S) or does not request for a telecommunication connection within the time slot or window (4.3), the server (S) sets a status on "call declined" (4.7), and terminates the connection with the caller (C) (4.5). If the receiver (R) indicates acceptance or closes the connection (4.4), the call can be accepted by the receiver (R) (4.6). The receiver can hang up the phone (4.8), if the receiver (R) does not call back within the predefined time slot (4.9), the server (S) sets a status on "call declined" (4.9) and the server (S) terminates the connection with the caller (C) (4.5). If the receiver (R) indicates acceptance of the call, the server (S) transmits a telephone number to the receiver (R), and may include a text or voice message and close the connection with the receiver (R) (4.10).

If the receiver (R) calls the server (S) within the time slot after closing the connection by the server in 4.10 or after the receiver closed the connection in 4.8, the server (S) response to said request for a telecommunication connection from the receiver (R) and establishes a telecommunication connection with the receiver (R), can functionally couple said telecommunication connection with said server (S) and the caller (C) in 4.12. when one of the receiver (R) and/or the caller (C) terminates the telecommunication connection (4.13), the server (S) terminates the connection with the caller (C) (4.5).

Before contacting the receiver (R), the server (S) may perform a number of security checks. The server (S) may be provided with a database (D) holding caller identifiers and receiver identifiers. The server (S) may run a query on the database. When finding the stored caller identifier (CID) or the stored receiver identifier (RID), the server (S) may perform a standardized action, or rules may be included in the database (D).

The database may comprise various lists or fields of permission. For instance, the database may hold a list indicating that a caller identifier is not allowed to contact one or more receiver identifiers. The database may also include indications that a caller identifier is not allowed to make any calls, or be limited to certain countries, or areas.

Figure 5A:
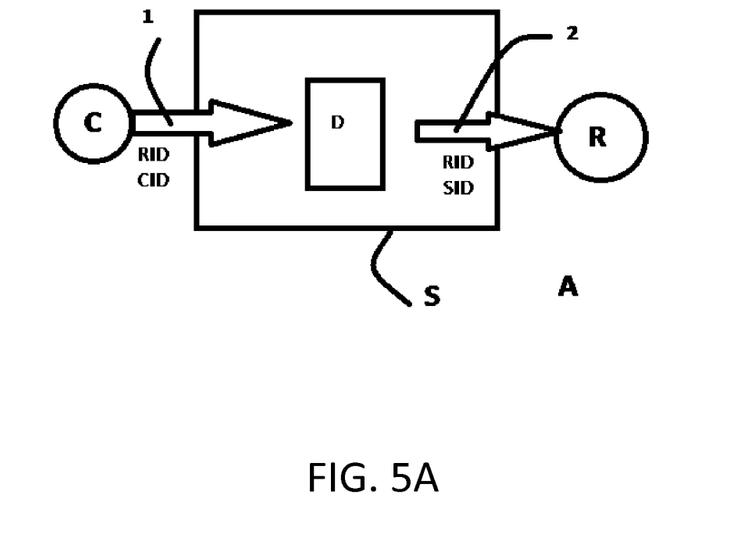
FIGS. 5A-5C schematically show an implementation of the telecommunication system using a server implemented as one server device, and FIGS. 6A-6C2 schematically show an implementation of the telecommunication system using a server implemented as two server device.

As already explained, the telecommunication system comprises a server (S). The server (S) runs software configuring the server (S) to perform the function illustrated. Thus, for instance, the server (S) may be one server device, usually remote from bother the calling external telecommunication device (CTD) and from the receiving external telecommunication device (RTD), running a computer program and storing a database and the caller identifier (CID) and the receiver identifier (RID). The telecommunication system may comprise a dedicated receiving external telecommunication device (CTD), and/or a dedicated calling external telecommunication device (CTD). In FIGS. 5A-6C2, some embodiments are shown.

In FIG. 5A, it is indicated how caller (C) (via his calling external telecommunication device CTD, not shown) establishes a data connection 1 with server (S), here only one server device. Via the data connection 1, the caller sends a receiver identifier (RID) and his caller identifier (CID) to the server (S). Installed on the server (S) is a database D. Alternatively, the server S is (functionally) coupled to the database D. Using the database D, server S checks if caller C (in fact, Caller identifier CID) is allowed to have a telecommunication connection to receiver R, in fact to receiver identifier RID. If this is the case, the server contacts receiver R via a data connection 2, using receiver identifier RID to contact the receiver (or, in fact, via the receiver external telecommunication device RTD).

Figure 5B:
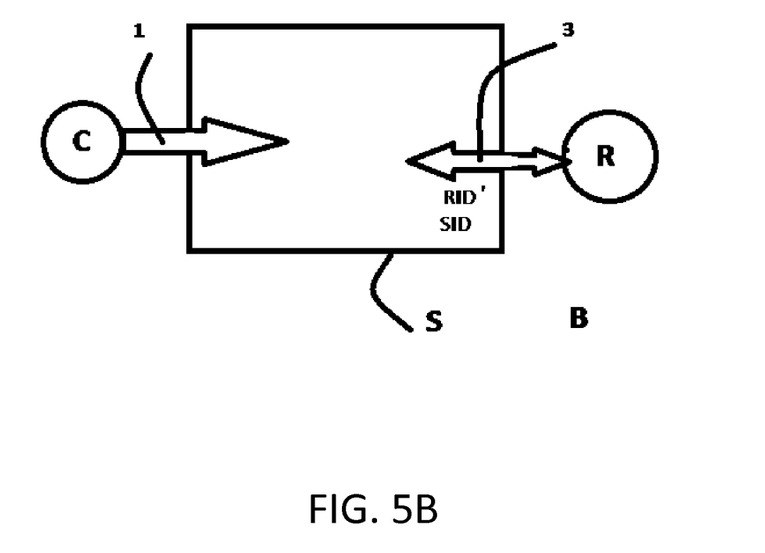
Figure 6A:
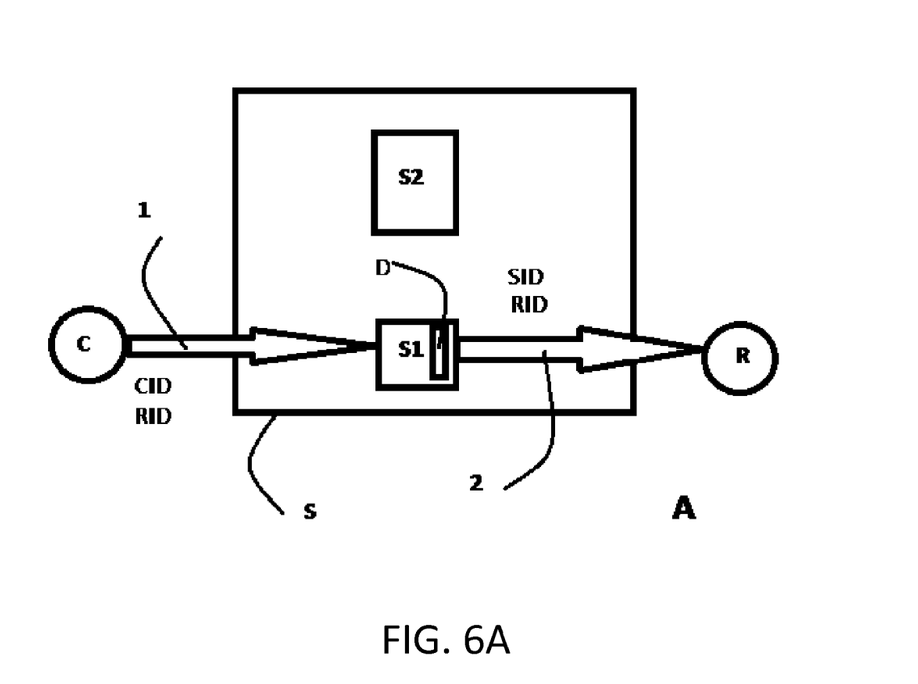

In FIG. 5B, the server S received a call back from the receiver R using his receiver identifier RID. The server S checks the transmitted receiver identifier RID, and establishes a telecommunication connection 3. In the mean time, caller C remains connected to the server S.

Figure 5C:
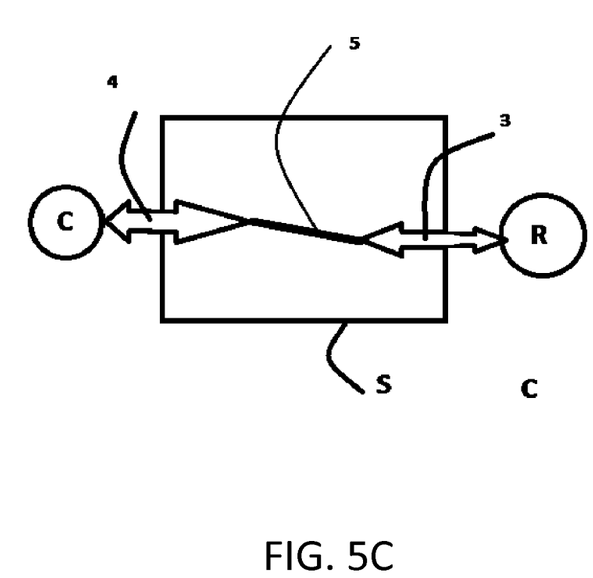

In FIG. 5C, it is indicated that the server S made the data connection 1 with caller C into a telecommunication connection 4. Furthermore, now established a telecommunication connection 5 between the caller C and the receiver R.

In FIGS. 6A-6C2, examples of implementing the server S using two server device S1 and S2 are illustrated. The server part defined earlier may for instance be server device S1. In this embodiment, in FIG. 6A, server device S1 comprises the database D that is used for the security check. Caller C here has a data connection 1 with the server device S1. Caller C provides his caller identifier CID and a receiver identifier RID to server device S1. Server device S1 checks if caller C is allowed to have a telecommunication connection with receiver R, using the database D. The server device S1 establishes a data connection 2 with receiver R using receiver identifier RID if a telecommunication connection with caller C is allowed. Using the data connection 2, a server identifier SID is transmitted by server device S1 to receiver R. Server device S1 may also indicate the caller C, for instance using the caller identifier (CID). The data connection 2 is subsequently closed.

Figure 6B:
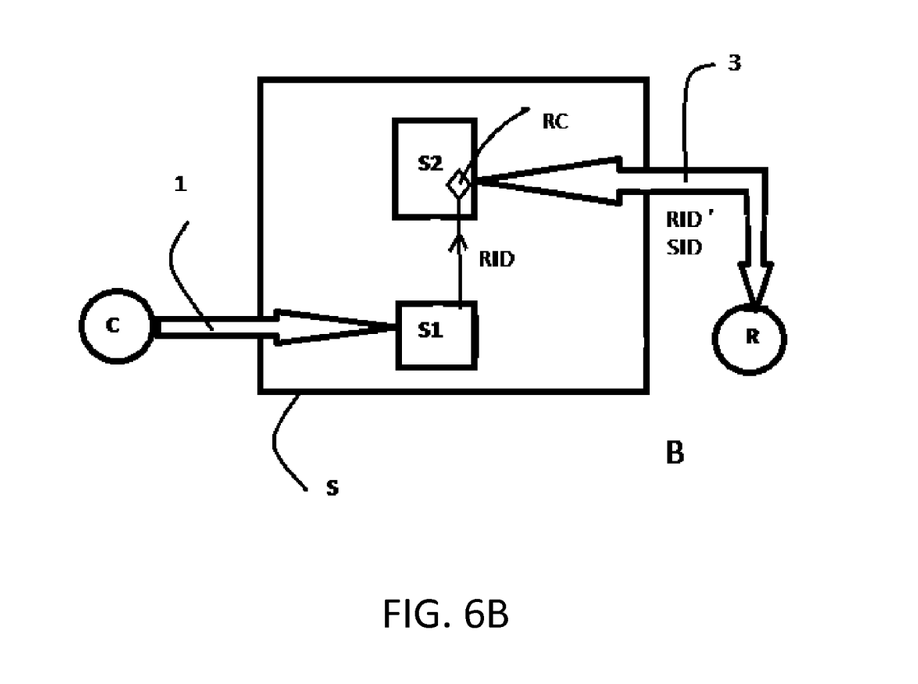
Figure 6C:
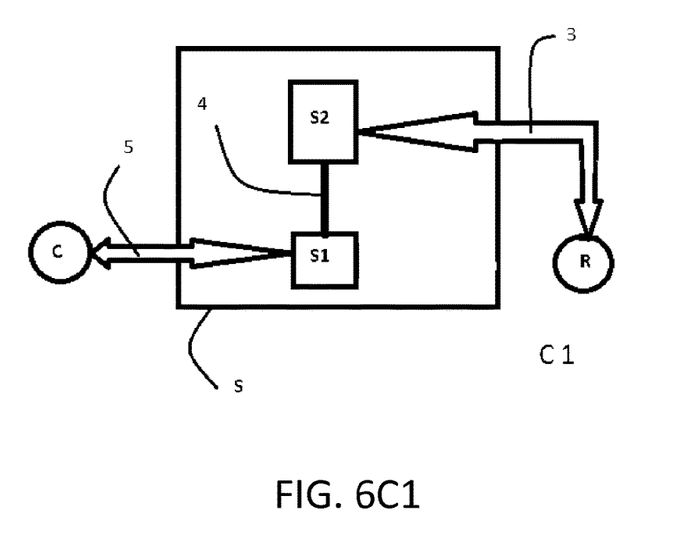

In FIG. 6B, it is indicated that receiver R now requests a telecommunication connection 3 with the server device S2. The server identifier SID may for instance be a service telephone number that is called by the receiver R. Server device S2 using control RC checks if the incoming request from receiver R has the same receiver identifier RID' as the receiver identifier RID that is here provided by the server device S1 to server device S2. If this is the case, in FIG. 6C1 server device S2 established a coupling 4 with server device S1. Furthermore, server device S1 makes the data connection 1 with caller C into telecommunication connection 5. Thus, functionally the various connection provide a telecommunication connection between the caller C and the receiver R. Caller C and receiver R experience a functionally live communication channel between them.

Figure 6C:
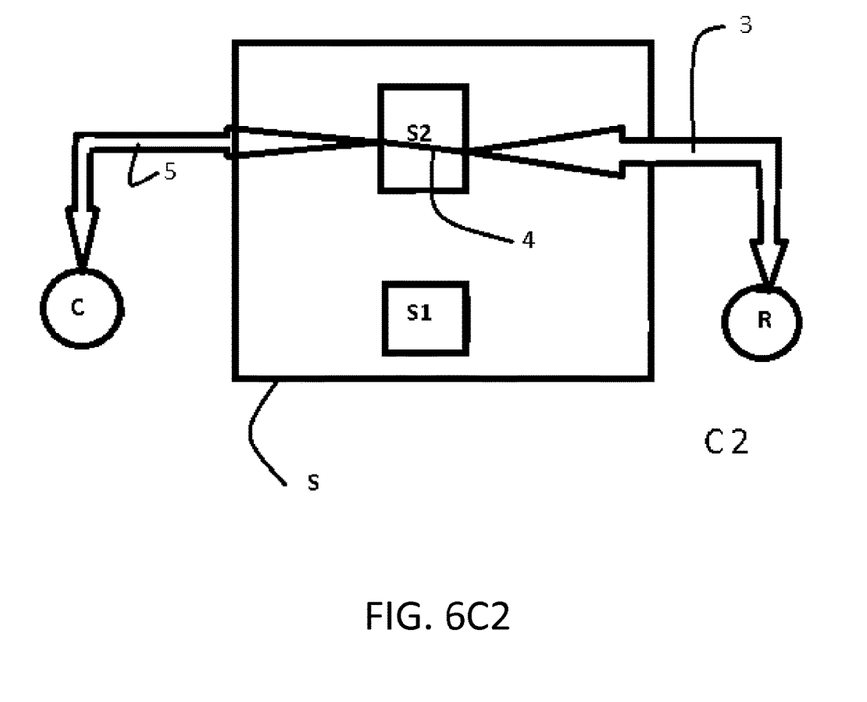

In FIG. 6C2, an alternative embodiment is demonstrated in which in fact the telecommunication connection runs via the server device S2 via connection 4. In this embodiment, the server device S1 transferred the data connection 1 with caller C to server device S2 and the connection became a telecommunication connection.

Using modern server implementations using cloud computing, it is evident that a server (S) can be modular, distributed. Thus, at least one of the computer program, the database, the caller identifier (CID) and the receiver identifier (RID) may also be distributed.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

The invention claimed is:

1. A telecommunication system comprising at least one server (S) running a computer program which enables said server (S) to:
   receive a request from a calling external telecommunication device (CTD) for a telecommunication connection with a receiving external telecommunication device (RTD);
   establish a data connection with said calling external telecommunication device (CTD) in response to said request;
   receive from said calling external telecommunication device (CTD) a receiver identifier (RID) and store said receiver identifier (RID);
   establish a data connection with said receiving external telecommunication device (RTD) using said receiver identifier (RID);
   transmit to said receiving external telecommunication device (RTD), after a data connection with said receiving external telecommunication device (RTD) is established, a server identifier (SID);
   close said data connection with said receiving external telecommunication device (RTD) after said transmission of said server identifier (SID);
   receive a request for a telecommunication connection from said receiving external telecommunication device (RTD) via said server identifier (SID) within a time slot after said closing; and
   check, in response to said request for a telecommunication connection from said receiving external telecommunication device (RTD) via said server identifier (SID), if a receiver identifier of said receiving external telecommunication device (RTD) matches said stored receiver identifier (RID), and establish a telecommunication connection through said server (S) between said calling external telecommunication device (CTD) and said receiving external telecommunication device (RTD) if the receiver identifier matches said stored receiver identifier (RID).

2. The telecommunication system of claim 1, wherein said computer program enables said server (S) to:
   further transmit to said receiving external telecommunication device (RTD), after a data connection with said receiving external telecommunication device (RTD) is established, with said server identifier (SID), an indication to the receiver (R) that in order to establish a telecommunication connection to use the receiving external telecommunication device (RTD) to request a data connection with said server (S) using said server identification (SID).

3. The telecommunication system of claim 1, wherein said computer program enables said server (S) to:
   further transmit to said receiving external telecommunication device (RTD), after a data connection with said receiving external telecommunication device (RTD) is established, with said server identifier (SID), an indication to the receiver (R) that in order to establish a telecommunication connection to use the receiving external telecommunication device (RTD) to request a data connection with said server (S) using said server identification (SID), and an indication to said receiver (R) of said time slot for establishing said request.

4. The telecommunication system of claim 1, wherein said computer program further enables said server (S) to:
   establish a billing of said receiving external telecommunication device (RTD) for the costs of said telecommunication connection.

5. The telecommunication system of claim 1, wherein said computer program enables said server (S) to:
   receive a request from a caller (C) using a calling external telecommunication device (CTD) for a telecommunication connection with a receiver (R) via a receiving external telecommunication device (RTD).

6. The telecommunication system of claim 1, wherein said computer program enables said server (S) to:
   maintain said data connection with said calling external telecommunication device (CTD) at least until the end of said time slot, and if said receiving external telecommunication device (RTD) establishes said telecommunication connection convert said data connection into a telecommunication connection.

7. The telecommunication system of claim 1, wherein said computer program enables said server (S) when receiving said request from a caller (C) to establish a telecommunication connection with said calling external telecommunication device (CTD) in response to said request.

8. The telecommunication system of claim 1, wherein said computer program enables said server (S) to:
   receive and store a caller identifier (CID) from said calling external telecommunication device (CTD) after establishing said data connection with said calling external telecommunication device (CTD) in response to said request of said calling external telecommunication device (CTD).

9. The telecommunication system of claim 4, wherein computer program further enables said server (S) to:

run a query on a database for said caller identifier (CID) and said receiver identifier (RID), said database provided on said server (S) and comprising a series of caller identifiers, receiver identifiers, and indications indicating telecommunication connection rights relating to caller identifiers, said rights comprising prohibitions to make a telecommunication connection to specified receiver identifiers; and establish said data connection with said receiving external telecommunication device (RTD) using said receiver identifier (RID) if the query results in a permission for providing a telecommunication connection of said caller (R) with said receiver (R).

10. The telecommunication system of claim 1, wherein computer program enables said server (S) to maintain a data connection with said calling external telecommunication device (CTD) until said receiving external telecommunication device (RTD) established a telecommunication connection with said server (S), more in particular until said server (S) establishes said telecommunication connection between said calling external telecommunication device (CTD) and said receiving external telecommunication device (RTD).

11. The telecommunication system of claim 1, wherein computer program further enables said server (S) to:
transmit to said receiving external telecommunication device (RTD), after said data connection with said receiving external telecommunication device (RTD) is established, in addition to said server identifier (SID), said stored caller identifier (CID), and an indication to the receiver (R) that in order to establish a telecommunication connection with said caller (C) identified with said caller identifier (CID) to use the receiving external telecommunication device (RTD) to request a data connection with said server (S) using said server identification (SID).

12. The telecommunication system of claim 1, wherein said time slot is less than five minutes, in particular less than two minutes.

13. The telecommunication system of claim 1, wherein said caller identifier (CID) comprises a calling external telecommunication device identifier.

14. The telecommunication system of claim 1, wherein said caller identifier (CID) comprises a user identifier identifying the caller (C).

15. The telecommunication system of claim 1, wherein server (S) comprises a server device, and said telecommunication connection is maintained by said server device.

16. The telecommunication system of claim 9, wherein said database is provided on said server (S) comprising a server device, and said telecommunication connection is maintained by said server device.

17. The telecommunication system of claim 1, wherein said server (S) comprises server devices, with a first server device maintaining said telecommunication connection, and database is provided on a further server device remote from said first server device.

18. The telecommunication system of claim 1, wherein said server (S) comprises server devices, with a first server device maintaining said telecommunication connection, and database is provided on a second server device remote from said first server device, and said telecommunication connection is provided via a third server device, in particular a third server device remote from said first and/or said second server devices.

19. The telecommunication system of claim 1, wherein said computer program enables said server (S) to provide billing of costs of said telecommunication connection based upon starting costs and duration of said telecommunication connection, more in particular enables said server to provide billing based upon the physical location of said calling external telecommunication device (CTD) and/or said receiving external telecommunication device (RTD).

20. The telecommunication system of claim 1, wherein said telecommunication connection comprises a voice connection, in particular using a VOIP protocol.

21. The telecommunication system of claim 1, wherein said telecommunication system comprises a series of dedicated communication devices, arranges for only contacting said server (S), and said dedicated communication devices each comprising a dedicated identifier, said server (S) comprising a database of dedicated identifiers of said dedicated calling telecommunication devices, in particular wherein said dedicated identifier is part of the caller identifier.

22. The telecommunication system of claim 1, wherein said computer program enables said server (S) to transmit a voice message to said receiving external telecommunication device (RTD) said voice message when played in said receiving external telecommunication device (RTD), telling said receiver (R) to request a telecommunication connection using said caller identifier (CID) within said time slot, telling the receiver (R) he/she is receiving a call request from a specified location, in particular asking the receiver (R) to accept the request by providing a user response via the receiving external telecommunication device (RTD) or to decline the request by providing an alternative user response via the receiving external telecommunication device (RTD), in particular said server (S) after the receiver input has been transmitted, or after a predefined time-out, closes said data connection with said receiving external telecommunication device (RTD).

23. The telecommunication system of claim 1, wherein said database comprises a series of caller identifiers, and for each caller identifier an indication of the right the caller (C) has and/or the calling external telecommunication device (CTD) has, or do not have, to establish a telecommunication connection with the receiver (R) and/or the receiver external telecommunication device (RTD).

24. A data processor comprising software code portions which, configure said data processor to:
receive a request from a calling external telecommunication device (CTD) for a telecommunication connection with a receiving external telecommunication device (RTD);
establish a data connection with said calling external telecommunication device (CTD) in response to said request;
receive from said calling external telecommunication device (CTD) a receiver identifier (RID) and store said receiver identifier (RID);
establish a data connection with said receiving external telecommunication device (RTD) using said receiver identifier (RID);
transmit to said receiving external telecommunication device (RTD), after a data connection with said receiving external telecommunication device (RTD) is established, a server identifier (SID);
close said data connection with said receiving external telecommunication device (RTD) after said transmission of said server identifier (SID);
receive a request for a telecommunication connection from said receiving external telecommunication device (RTD) via said server identifier (SID) within a time slot after said closing; and check, in response to said request for a telecommunication connection from said receiving external telecommunication device (RTD) via said server identifier (SID), if a receiver identifier of said receiving external telecommunication device (RTD) matches said stored receiver identifier (RID), and establish a telecommunication connection between said calling external telecommunication device (CTD) and said receiving external telecommunication device (RTD) if the receiver identifier matches said stored receiver identifier (RID).

25. A method for establishing a telecommunication connection between a calling external telecommunication device (CTD) and a receiving external telecommunication device (RTD) via a server (S), wherein said server (S) comprises a computer program which, when running on sad server, configures said server to:

receive a receiver identifier (RID) from said calling external telecommunication device (CTD);

transmit to said receiving external telecommunication device (RTD), contacted using at least part of said receiver identifier (RID), a server identifier (SID);

close said data connection with said receiving external telecommunication device (RTD) after said transmission of said server identifier (SID);

receive a request for a telecommunication connection from said receiving external telecommunication device (RTD) via said server identifier (SID) within a time slot after said transmission;

check, in response to said request for a telecommunication connection from said receiving external telecommunication device (RTD) via said server identifier (SID), if a receiver identifier of said receiving external telecommunication device (RTD) matches said stored receiver identifier (RID); and establish a telecommunication connection through said server (S) between said calling external telecommunication device (CTD) and said receiving external telecommunication device (RTD) if the receiver identifier matches said stored receiver identifier (RID).

26. A communication device limited to contact only the telecommunication system of claim 1, said communication device comprising a device identifier (DID) that is transmitted to said telecommunication system when contacting said telecommunication system, in particular said device identifier (DID) forming part of said caller identifier (CID).

27. A server part for the telecommunication system of claim 1, said server part forming part of the server (S) of the telecommunication system and running a computer program which enables said server part to:

receive said request from said calling external telecommunication device (CTD) for said telecommunication connection with said receiving external telecommunication device (RTD);

establish said data connection with said calling external telecommunication device (CTD) in response to said request;

receive from said calling external telecommunication device (CTD) said receiver identifier (RID) and store said receiver identifier (RID);

establish said data connection with said receiving external telecommunication device (RTD) using said receiver identifier (RID);

transmit to said receiving external telecommunication device (RTD), after said data connection with said receiving external telecommunication device (RTD) is established, said server identifier (SID).

28. The server part of claim 27, said computer program which enables said server part to further:

communicate to said further server (S) said receiver identifier (RID), and said time slot, and facilitates in establishing a telecommunication connection between said caller (C) and said receiver (R) through said server (S).

* * * * *